United States Patent [19]

Hård af Segerstad et al.

[11] 4,190,367
[45] Feb. 26, 1980

[54] DEVICE FOR ESTABLISHING A CONDITION AT THE SURFACE OF A SUBJECT

[76] Inventors: Sverker Hård af Segerstad, Långåsliden 28, Göteborg, Sweden, 41270; Olle Nilsson, Dr. Forseliusgata, 50, Göteborg, Swe-41326

[21] Appl. No.: 852,154

[22] Filed: Nov. 16, 1977

[30] Foreign Application Priority Data

Dec. 7, 1976 [SE] Sweden ................. 7613703

[51] Int. Cl.$^2$ .............. C01B 9/02; G01N 21/48; G01B 11/30
[52] U.S. Cl. ................... 356/354; 356/446; 356/447; 356/371
[58] Field of Search ............. 356/211, 212, 120, 111, 356/103, 210; 350/16 ZR

[56] References Cited

U.S. PATENT DOCUMENTS 4,097,160  6/1978  Yataki et al. ................. 356/210 X Primary Examiner—Vincent P. McGraw
Assistant Examiner—Rodney B. Bovernick
Attorney, Agent, or Firm—Holman & Stern

[57] ABSTRACT

A device for establishing the magnitude of irregularities at a surface includes a laser directing a beam of light, obliquely towards said surface, a photodetector mounted so as to catch a beam of light reflected from an irregularity at said surface, and a diffraction grating mounted in the path of a beam, mirror-image reflected from said surface and movable in relation thereto. The photodetector is provided with means for measuring the frequency and the amplitude of the time-dependent photocurrent caused by the interaction between the beam reflected from the irregularity and a further beam deflected by the diffraction grating from the mirror-image reflected beam.

In a modified version the device may be used for measuring flow velocity, the laser and the photodetector being mounted to opposite sides of a flow path defined by transparent walls.

10 Claims, 4 Drawing Figures

DEVICE FOR ESTABLISHING A CONDITION AT THE SURFACE OF A SUBJECT

BACKGROUND OF THE INVENTION

The present invention refers to a device adapted to establish the condition at a surface by measuring of scattered light. This is attained by estimating the interference between the known, scattered light emitted by a reference object, and the unknown, scattered light emitted by the subject in question, which is lighted by the same beam as the reference object. The device is, in the first hand, adapted to measure the roughness of a surface, but may also be utilized for determining velocity, and for a very sensitive and exact registration of weak, scattered light in general.

Devices using laser beams have been used for examining i.a. the smoothness of metal surfaces. By measuring, by means of a photodetector, the intensity of diffusely scattered light, as a function of the angle in relation to a mirror-reflected beam, it is possible to obtain an apprehension of the smoothness of the surface. One advantage with such a method is that it is not necessary to touch the surface.

A disadvantage of this method is that it is rather un-sensitive, especially when fine surfaces are involved, as the intensity of the diffusely scattered light will be low. The method, further, is very sensitive to disturbances caused by incidental light, and it is difficult to determine the angle between the diffuse light, and the reflected beam. On many occasions the angle is small, and it is difficult to maintain the surface completely still, due i.a. to vibrations, normally occurring in a building.

SUMMARY OF THE INVENTION

One aim of the invention is to remove the disadvantages above referred to and is characterized in a diffraction grating located in the path of a beam reflected from said surface, means for causing a relative movement between the plate and the surface and further means for measuring the frequency and the amplitude of the time-dependent photocurrent and determined by a beam (c) reflected from the surface and depending upon the irregulations thereof, said beam, within the detector coinciding with a further beam (e) deflected by the grating.

In a preferred embodiment the diffraction grating is arranged to be moved transversely with respect to the beam of light, either by rotation, or by reciprocation, which results in a time-variable component in the photocurrent at the detector, the frequency of which is exactly defined by the speed of the diffraction grating the angle of deflection, the angle of ingress towards the grid and the wave-length of the light. If the grid constant of the diffraction grating and the angle of ingress are known the angle of deflection will be determined thereby. The amplitude of the time-dependent photocurrent is proportional to the amplitude of the scattered light, as well as that of the deflected beam. It is easy, once and for all, to measure the amplitude of the deflected beam, and in such manner the amplitude of the light scattered from the surface may be determined. In this manner a far higher sensitivity (several ten-potentials) than with arrangements, hitherto known, will be obtained, which makes it possible to detect even extremely small irregularities in a surface.

The disadvantages of sensitivity to incidental light is also eliminated, as only light impinging upon the detector, closely parallel to the beam of scattered light will influence the time-variable photocurrent. The beams of scattered light and deflected light must be closely parallel and coincide upon the detector, which is obtainable by selecting the distance between the surface and the diffraction grating smaller than the distance between the surface and the photodetector, and also much smaller than the cross-sectional radius of beam of light at the surface, divided by the angle of deflection, counted in radians.

DESCRIPTION OF SOME PREFERRED EMBODIMENTS

Figure 1:
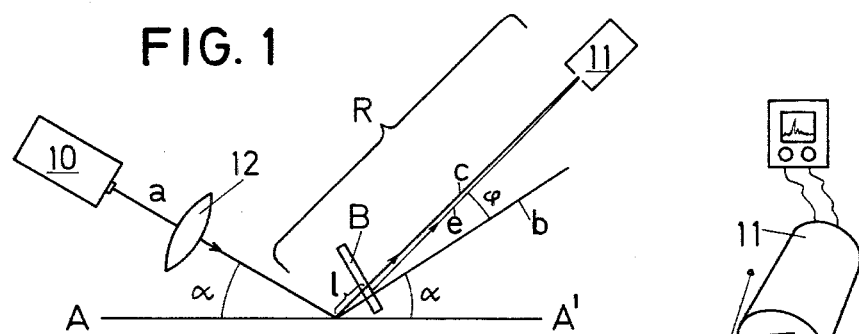
FIG. 1 schematically shows an arrangement for working the invention in connection with measuring of surface smoothness, FIG. 2 schematically shows an equipment suited for practical use.

FIG. 1 schematically shows an equipment adapted to be used for measuring the smoothness of a surface A—A'. This equipment includes a source of light, preferably a He-Ne laser apparatus, where the wave-length is 0.63 $\mu$m, a diffraction grating B and a photodetector 11. The laser 10 is mounted in such a manner that it will direct a beam of light a against surface A—A'. The beam passes a lens system 12 including polarizing means.

When this beam meets the surface a second beam b is reflected and forms the same angle with respect to the surface as beam a (conventional mirror-reflection). Furthermore a number of beams of scattered light will appear, the condition thereof depending upon the irregularities of the surface. One of these scattered beams, denoted by c in the drawing and defined below, will be measured by the apparatus. The diffraction grating B is located in the path of beam b, and is maintained in movement, either reciprocatory or rotating, with respect to the surface. A beam e will then be deflected from beam b and will be directed against the photodetector. The diffraction grating will of course also deflect a beam from beam c, but as this beam is noticeably weaker than beam b this secondary deflection may be disregarded.

Beam c is one of the many beams scattered from the surface and is used as it coincides with beam e at the detector. Due to the fact that diffraction grating B is moving the photocurrent will include a time-variable component. This time-variable current is analyzed with respect to frequency and amplitude, which will make it possible to estimate the roughness condition of the surface.

As mentioned above the directions of beams c and e must not differ very much, and it is therefore necessary that the distance l between surface A—A' and the diffraction grating B is considerably smaller than distance R between the surface and the photodetector. It is also important, that $l \leq (D/2\phi)$, where D is the diameter of the beam adjacent to surface A—A', and $\phi$ is the angle of deflection.

Figure 2:
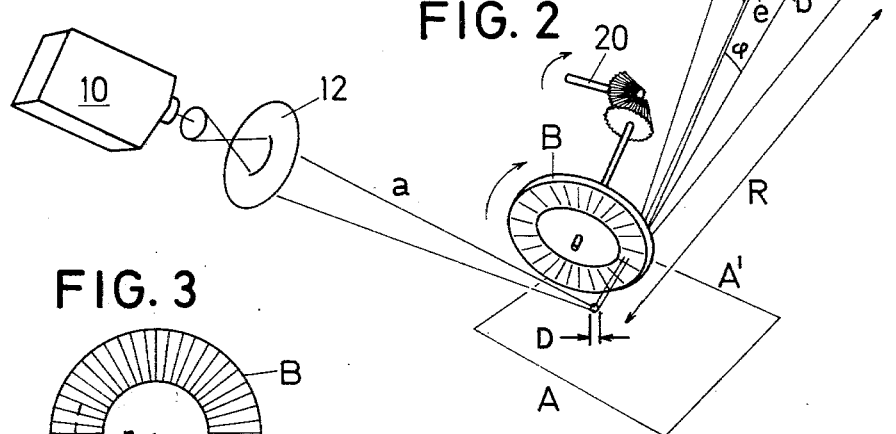

FIG. 2 illustrates the principles of a practical embodiment of an apparatus adapted to measure the roughness of a surface. The diffraction grating B is here formed as a rotatable disc, and reference 20 denotes a simple means for maintaining a constant speed at the disc.

Figure 3:
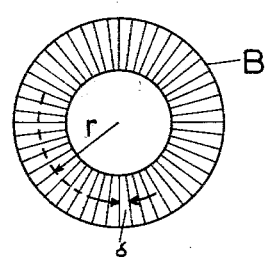
FIG. 3 shows a diffraction grating forming part of the equipment according to FIG. 2.

FIG. 3 shows an end view of the disc, where r indicates the radius of a pitch circle within the diffraction grating and δ is the diffraction constant thereof.

Typical dimensions for such a practical embodiment are r = 10–30 mm
δ = 0.1–0.3 mm
R = 1–3 m
l = 10–20 mm.

The capacity of the diffraction grating should be such that the strength of the beam directed towards the photodetector is about 1–10 μW, i.e. about 0.1% of the laser power. The speed Ω of the disc may be 10 r/min.

The frequency, f, of the detected signal is $(2\pi r\Omega)/\delta = 5\text{–}15$ kHz.

The advantage of having an exactly defined grid at the disc is that it will be possible, beforehand, to calculate the frequency of the detected signal. This is favourable, especially in surroundings where external disturbances cannot be eliminated.

Grating B preferably has a well defined grid, but it is possible, alternatively, to use a plate, diffusely scattering the light, for instance a plate of frosted glass. With a comparatively big detector surface it is possible to measure the scattering of the light over a big angular range. The main beam b must then be masked. The frequency spectrum of the output signals will then directly represent the angular distribution of the scattered light, which, in turn, is a function of the distribution and magnitude of the irregularities at the surface. The sensitivity will, on such occasion be less than with the previously described embodiment, but still better than with other, known methods.

The same basic principle may be used also in other measuring arrangements. The diffraction grating may thus be reflecting instead of being transparent. It is not necessary that the object to be measured possesses a reflecting surface. The object may be, or includes a more or less transparent body. It is furthermore theoretically possible, but probably rather unpractical, to have a stationary diffraction grating and a movable object.

Figure 4:
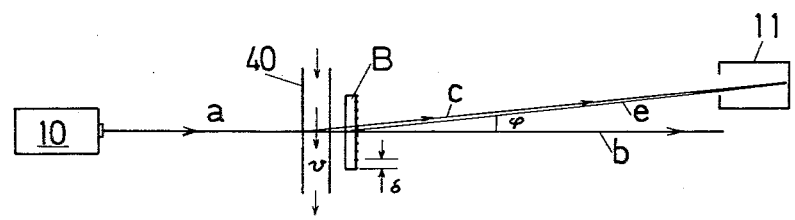
FIG. 4 shows an embodiment of the invention, as used for measuring velocity.

An arrangement including a stationary diffraction grating may, however, be used to determine the velocity of a movement at the object. Such an arrangement is illustrated in FIG. 4, and is adapted to determine the velocity V of a flowing liquid. In order that reliable measuring results be obtainable, it is presupposed that the liquid contains particles which reflect light.

The laser is, as before, denoted by 10, the photodetector by 11, and the diffraction grating by B. The grid constant is denoted δ. The liquid flows through a transparent tube 40, and when passing this tube beam a is continued by beam b, being a linear extension. Furthermore a beam c of scattered light and a beam e, being deflected from beam b by the diffraction grating, are obtained.

The frequency f of the time dependent photocurrent in a diffraction spot of the first order will be $f = (V/\delta)$. The speed V of the flow of liquid may thus be measured by a simple calculation of the frequency.

The strength of the signal will depend upon the number of particles in the liquid. The device may thus also be used for calculating the content of contaminations in a liquid.

The expression beam is used in the specification and the claims, but this must not be understood as necessarily meaning visible light. The use of visible light is preferable for several reasons, but the inventions may also make use of other forms or radiation, outside the visible range.

What we claim is:

1. An optical detection device for measuring smoothness at a surface of a subject including
   a coherent light emitting source and means to mount said source so it directs a beam of light obliquely towards the surface of said subject,
   a photodetector and means to mount said photodetector outside the path of a main beam being mirror-image reflected from said surface but so it catches a secondary beam of scattered light reflected from an irregularity at said surface,
   a diffraction grating and means to mount said grating in the path of said main reflected beam, so a further beam, deflected from said main reflected beam will coincide said secondary beam within said photodetector,
   means for causing a relative movement between said grating and said subject, and
   further means for measuring the frequency and the amplitude of the time dependent photocurrent determined by the interaction of said reflected, secondary beam and said deflected beam within the photodetector.

2. The device according to claim 1, in which the diffraction grating is located at a distance from the subject, which is noticeably smaller than the distance between the subject and the photodetector, as well as smaller than the cross sectional radius of said reflected secondary beam of light close by the subject, divided by the angle of deflection, measured in radians.

3. The device according to claim 1, in which the diffraction grating is kept in a uniform movement while the subject is kept stationary.

4. The device according to claim 3, in which the diffraction grating is a circular disc, and is connected to an apparatus adapted to rotate the disc at a constant speed.

5. The device according to claim 1, in which the diffraction grating is provided with a grid having a well defined grid constant.

6. The device according to claim 1, in which the diffraction grating is adapted to deflect a diffuse light.

7. An optical device for measuring inhomogenities in a transparent subject volume including a flow passage defined by transparent walls, said device comprising
   a coherent light emitting source and means to mount said source so it directs a beam of light towards one of said transparent walls,
   a photodetector and means to mount said photodetector at the opposite side of said subject, as counted from said source, and further outside the path of a main beam passing said transparent walls, but so it catches a secondary beam of light reflected from the flow passage between said walls,
   a diffraction grating and means to mount said grating in the path of said main reflected beam so a further beam deflected from said main reflected beam will coincide with said secondary beam within said photodetector,
   means for causing a flow of fluid containing light reflecting particles between said transparent walls, and further
   further means for measuring the frequency and the amplitude of the time dependent photocurrent determined by the interaction of said reflected, secondary beam and said deflected beam within the photodetector.

8. The device according to claim 7, in which the diffraction grating is located at a distance from the subject, which is noticeably smaller than the distance between the subject and the photodetector, as well as smaller than the cross sectional radius of said reflected secondary beam of light close by the subject, divided by the angle of deflection, measured in radians.

9. The device according to claim 7, in which the diffraction grating is provided with a grid having a well defined grid constant.

10. The device according to claim 7, in which the diffraction grating is adapted to deflect a diffuse light.